United States Patent
Vicenzo

(10) Patent No.: US 9,347,548 B2
(45) Date of Patent: May 24, 2016

(54) SHUTTER MEMBER FOR A MOTOR VEHICLE CONTROL LEVER, AND TUNNEL CONSOLE PROVIDED WITH SUCH SHUTTER MEMBER

(75) Inventor: Tommaso Vicenzo, Turin (IT)

(73) Assignee: FIAT GROUP AUTOMOBILES S.P.A., Turin (IT)

(*) Notice: Subject to any disclaimer, the term of this patent is extended or adjusted under 35 U.S.C. 154(b) by 235 days.

(21) Appl. No.: 13/607,975

(22) Filed: Sep. 10, 2012

(65) Prior Publication Data

US 2013/0239740 A1 Sep. 19, 2013

(30) Foreign Application Priority Data

Sep. 12, 2011 (EP) .................................. 11425231

(51) Int. Cl.
*F16H 59/02* (2006.01)
*G05G 25/04* (2006.01)

(52) U.S. Cl.
CPC ............ *F16H 59/0213* (2013.01); *G05G 25/04* (2013.01); *Y10T 74/2093* (2015.01)

(58) Field of Classification Search
CPC ................ F16H 59/0213; F16H 59/02; F16H 2059/026; G05G 25/04; Y10T 74/2093
USPC ........... 74/566, 565, 526, 540, 542, 523, 524, 74/528, 473.1, 473.13–473.15, 473.3, 74/473.34; 180/90.6; 116/28.1, DIG. 20
See application file for complete search history.

(56) References Cited

U.S. PATENT DOCUMENTS

| | | | | |
|---|---|---|---|---|
| 1,424,382 | A * | 8/1922 | Sanderson | 180/90.6 |
| 4,565,151 | A * | 1/1986 | Buma | 74/566 |
| 5,622,086 | A * | 4/1997 | Suzuki et al. | 74/566 |
| 6,082,286 | A * | 7/2000 | Kovach et al. | 74/566 |
| 6,155,128 | A * | 12/2000 | Ersoy et al. | 74/473.12 |
| 6,443,031 | B1 * | 9/2002 | Kim | 74/566 |
| 7,334,496 | B2 * | 2/2008 | Ersoy | 74/473.12 |
| 7,484,433 | B2 * | 2/2009 | Arakawa et al. | 74/566 |
| 2004/0211281 | A1 * | 10/2004 | Ersoy | 74/473.3 |
| 2005/0172883 | A1 * | 8/2005 | Arakawa et al. | 116/28.1 |
| 2006/0196298 | A1 * | 9/2006 | Wang | 74/473.1 |
| 2011/0017011 | A1 * | 1/2011 | Beyer et al. | 74/566 |

FOREIGN PATENT DOCUMENTS

| | | | |
|---|---|---|---|
| DE | 19728548 | | 3/1998 |
| DE | 10131439 | A1 * | 1/2003 |
| DE | 10244454 | A1 * | 3/2004 |

(Continued)

OTHER PUBLICATIONS

EPO Translation of Description of WO 9740299 A1, Llorens, Oct. 30, 1997.*

(Continued)

*Primary Examiner* — Daniel Yabut
(74) *Attorney, Agent, or Firm* — Gottlieb, Rackman & Reisman PC

(57) ABSTRACT

A shutter member that has a shutter with a substantially rigid wall. The shutter has a substantially arc-shaped side profile that is provided with a hole which is adapted to be engaged by a motor vehicle control lever. The substantially rigid wall is supported by a fastening device, fixing the shutter member to the control lever. The shutter has a tab, which defines a longitudinal extension of the substantially rigid wall and is elastically flexible.

16 Claims, 3 Drawing Sheets

(56) References Cited

FOREIGN PATENT DOCUMENTS

| EP | 836039 B1 | * | 11/2001 |
| EP | 1447732 | | 8/2004 |
| WO | WO 9740299 A1 | * | 10/1997 |
| WO | WO 02052177 | | 7/2002 |

OTHER PUBLICATIONS

European Search Report for Corresponding EP Appln. No. EP 11 42 5231.

* cited by examiner

SHUTTER MEMBER FOR A MOTOR VEHICLE CONTROL LEVER, AND TUNNEL CONSOLE PROVIDED WITH SUCH SHUTTER MEMBER

CROSS-REFERENCE TO RELATED APPLICATION

This patent application claims benefit under 35 U.S.C. §119 to EP 11425231.5 filed Sep. 12, 2011, which is hereby incorporated by reference in its entirety.

FIELD OF THE INVENTION

The present invention relates to a shutter member for a motor vehicle control lever, in particular for a hand brake lever.

BACKGROUND OF THE INVENTION

As known, the hand brake lever is hinged to a fixed structure and, by rotation about a horizontal axis, slides within a slot of said fixed structure. The slot is closed by a shutter or by coverings made of rubber, plastic or leather, which prevent dust and other objects from entering through the slot allowing, however, the lever to move back and forth.

In the solutions provided with a shutter, the latter has a hole slidingly engaged by the lever and is pulled back and forth by the lever itself while being guided by two side rails.

In some solutions, such as that shown in DE10244454A1, the shutter is made of a flexible material, while the two side rails are made with a curve so as to bend the shutter downwards behind the slot when the lever is raised and rotated backwards.

A solution of the type just described, however, is relatively complex to assemble and requires relatively precise positioning tolerances of the components in the longitudinal direction.

In addition, the hand brake lever traditionally has an elongated rectilinear shape, which also imposes limits on volume and shape in the design of the surrounding spaces.

SUMMARY OF THE INVENTION

The aim of the present invention is to create a shutter member for a motor vehicle control lever, which will simply and economically resolve the problems outlined above.

In an embodiment, the present invention relates to a shutter member for a motor vehicle control lever.

In an embodiment, the present invention also relates to a tunnel console of a motor vehicle for a control lever that is rotatable about an axis between two end limit positions. The tunnel console can comprise a structure that is adapted to be arranged between two front seats of the vehicle and has a slot configured for the control lever to be arranged therein; a shutter member that comprises a front body that has a first wall that is continuously curved between a first end and a second end and that includes a first upper surface and a first lower surface opposing the first upper surface extending longitudinally between a first sidewall and a second sidewall that is spaced from and parallel to the first sidewall and delimited at the first end extending transverse between the first sidewall and the second sidewall and the second end, which is spaced from the first end, extending transverse between the first sidewall and the second sidewall of the first wall and a first half-shell defining a first cavity extending from the first lower surface of the first curved wall, a rear body, which is separate from and independent of the front body, having a second wall that is continuously curved between a first end and a second end and that includes a second upper surface and a second lower surface opposing the second upper surface extending longitudinally between a first sidewall and a second sidewall that is spaced from and parallel to the first sidewall and delimited at the first end extending transverse between the first sidewall and the second sidewall and the second end, which is spaced from the first end, extending transverse between the first sidewall and the second sidewall of the second wall and a second half-shell defining a second cavity extending from the second lower surface of the second curved wall, the front body and the rear body together defining an opening adapted to surround said control lever at the second end of the front body and the second end of the rear body and the first half-shell and the second half-shell being connectable to each other by fasteners, and an elastically flexible tab extending from the first end of one of the first wall or the second wall; and at least one guiding element extending from the structure, which guides said tab and bends said tab downward during a rotation of said control lever toward the guiding element.

In an embodiment, the slot can be defined by a substantially rigid wall that has a lower surface facing the first upper surface and the second upper surface of the shutter member with the substantially rigid wall with the slot having a side profile that is substantially arc-shaped as viewed in relation to an axis of rotation of said control lever.

In an embodiment, the guiding element can comprise two lateral appendices, which are symmetrical, extend parallel to each other and are transversely spaced from each other to define a lower support for said tab.

In an embodiment, the guiding element can comprise a deflector extending from the structure transverse to the slot with the deflector defining an upper stop for the tab configured to bend the tab downwards during rotation of the control lever. In an embodiment, the structure can comprise a rear half-structure defining an internal cavity having an upper opening and an upper cover that is arranged to close the upper opening and fixed with respect to the rear half-structure to define at least part of said slot with said lateral appendices formed integral with the rear half-structure. In an embodiment, the structure can comprise a rear half-structure defining an internal cavity having an upper opening and an upper cover that is arranged to close the upper opening and fixed with respect to the rear half-structure to define at least part of the slot with the deflector is formed integral with the rear half-structure.

In an embodiment, the control lever can be a hand brake lever that comprises a lower end portion housed in the structure, an intermediate portion extending from the lower end portion external to the structure, an elbow extending between the intermediate portion and the lower end portion and having an upward concavity, and an upper handle, which is supported by the intermediate portion, has a substantially plate shape and is substantially orthogonal to the intermediate portion.

In an embodiment, the present invention relates to a shutter member for a motor vehicle control lever where the shutter member comprises a front body having a first wall that is continuously curved between a first end and a second end and that includes an upper surface and a lower surface opposing the upper surface extending longitudinally between a first sidewall and a second sidewall that is spaced from and parallel to the first sidewall and delimited at the first end extending transverse between the first sidewall and the second sidewall and the second end, which is spaced from the first end, extending transverse between the first sidewall and the second sidewall of the first curved wall with a first aperture extending from the second end of the first wall, between the upper surface and the lower surface of the first wall, toward the first end of the first wall and a first half-shell defining a first cavity extending from the lower surface at the second end of the first wall; a rear body, which is separate from and independent of the front body, having a second wall that is continuously curved between a first end and a second end and that includes an upper surface and a lower surface opposing the upper surface extending longitudinally between a first sidewall and a second sidewall that is spaced from and parallel to the first sidewall and delimited at the first end extending transverse between the first sidewall and the second sidewall and the second end, which is spaced from the first end, extending transverse between the first sidewall and the second sidewall of the second curved wall with a second aperture extending from the second end of the second wall, between the upper surface and the lower surface of the second wall, toward the first end of the second wall and a second half-shell defining a second cavity extending from the lower surface at the second end of the second wall; and an elastically flexible tab that is bendable upon an application of force extending from the first end of one of the first wall or the second wall. The first half-shell and the second half-shell are connectable to each other by fasteners such that when the first half-shell and the second half-shell are fastened to each other, the first aperture of the front body and the second aperture of the rear body together define an opening that is configured to surround the control lever.

In an embodiment, the first half shell of the front body can include a first sidewall extending from the lower surface of the first wall and a second sidewall spaced parallel to the first sidewall extending from the lower surface of the first wall and a third sidewall extending between the first sidewall and the second sidewall to define the first cavity.

In an embodiment, the second half shell of the rear body can include a first sidewall extending from the lower surface of the second wall, a second sidewall spaced parallel to the first sidewall extending from the lower surface of the second wall and a third sidewall extending the lower surface of the second wall between the first sidewall and the second sidewall to define the second cavity.

In an embodiment, the tab can extend in a cantilevered manner with respect to one of the first body and the second body. In an embodiment, the tab can have a lower face with a plurality of recesses formed therein, which are transversely elongated and longitudinally spaced from each other.

In an embodiment, the front body and the rear body are each independently comprised of a single piece of plastic material.

In an embodiment, the first half-shell and the second half-shell together delimit the first cavity and the second cavity which are adapted to be engaged by said lever. In an embodiment, the first half-shell and the second half-shell each comprise snap-coupling means to be engaged to one another to fasten the first half-shell and the second half-shell to each other. In an embodiment, fastening elements adapted to fix said first half-shell and said second half-shell to said control lever.

In an embodiment, the present invention relates to a tunnel console of a motor vehicle for a control lever that is rotatable about an axis between two end limit positions comprises a structure having a slot, which has a lower annular edge; a control lever, which engages the slot and is rotatable in the slot with respect to the structure about a horizontal axis between two end limit positions; a shutter member arranged within and coupled to said structure to encompass an empty space around the control lever in the slot, said shutter member comprising a shutter including a substantially rigid wall, an elastically flexible tab extending in a cantilevered manner from the first end of the substantially rigid wall, a hole that is arranged in the substantially rigid wall, is spaced from the tab and surrounds the control lever and fastening elements fixing the shutter member to the control lever; and at least one guiding element extending from the structure, guiding the tab and bending the tab downward during a rotation of the control lever about the horizontal axis toward the guiding element. The lower annular edge and the substantially rigid wall having respective side profiles extending along respective circle arcs that are concentric about the horizontal axis.

In an embodiment, the shutter member is formed of a front body and a rear body, each one of the front body and the rear body is a single piece and is independent and distinct from the other of the front body and the rear body and the substantially rigid wall is formed of a front portion and a rear portion that together define the hole and are part of the front body and the rear body, respectively.

In an embodiment, the front body comprises a front half-shell that projects from the front portion toward the horizontal axis and the rear body comprises a rear half-shell that projects from the rear portion toward the horizontal axis and together the front half-shell and the rear half-shell delimit a seat engaged by the control lever. In an embodiment, the fastening elements directly secure at least one of the front half-shell and the rear half-shell to the control lever. In an embodiment, the front half-shell and the rear half-shell are snap-coupled to each other.

BRIEF DESCRIPTION OF THE DRAWINGS

For a better understanding of the present invention a preferred embodiment is now described, purely by way of non limitative example, with reference to the attached drawings in which.

DETAILED DESCRIPTION OF THE INVENTION

Figure 1:
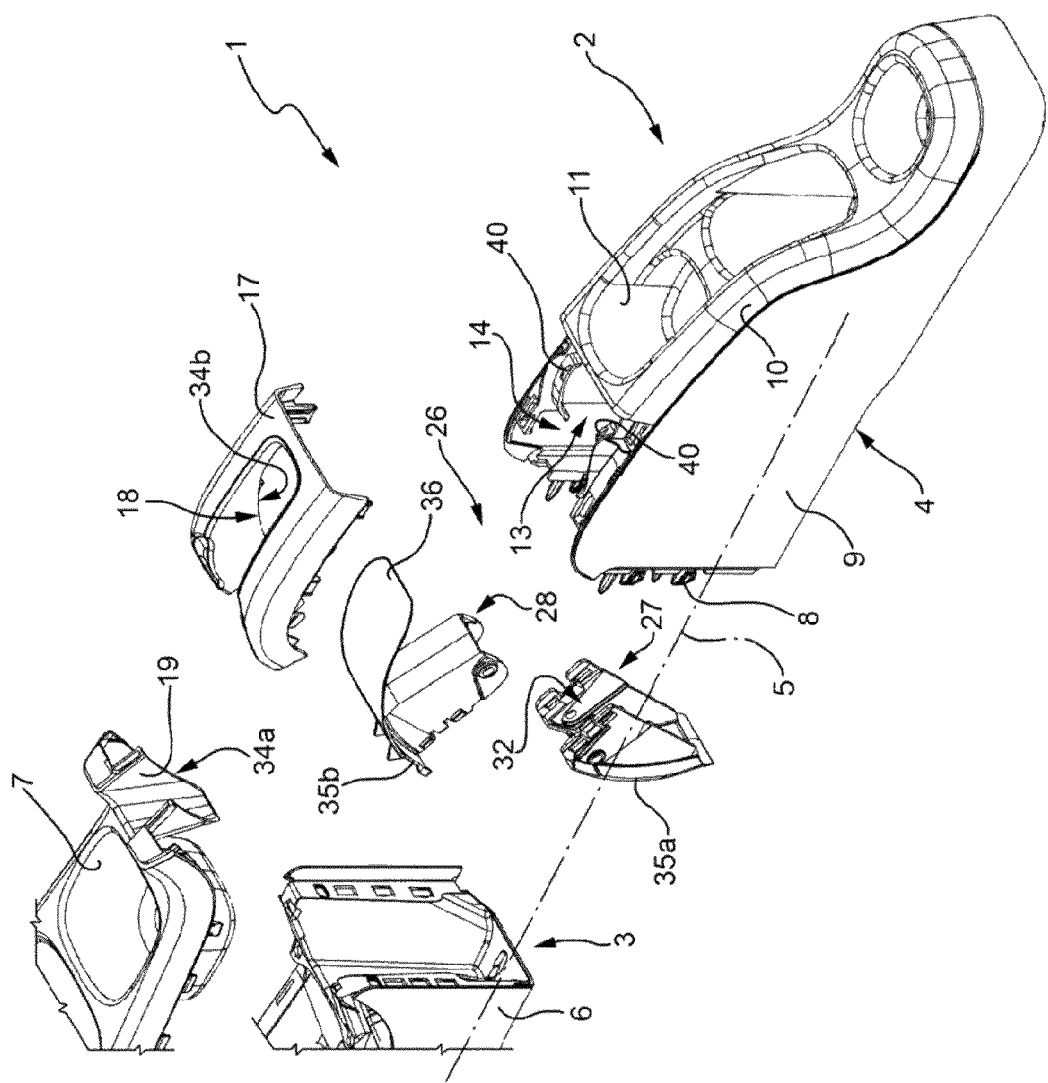
FIG. 1 illustrates in perspective and exploded view a preferred embodiment of the shutter member for a motor vehicle control lever according to the present invention.

In FIG. 1, with 1 is indicated, as a whole, a tunnel console (partially shown) comprising a structure 2 adapted for being mounted in a fixed position in the passenger compartment of a vehicle between two front seats (not shown).

The structure 2 is preferably made of a plastic material and comprises a front half-structure 3 (partially shown) and a rear half-structure 4, which are aligned with each other along a longitudinal axis 5, which coincides with the advancing direction of the motor vehicle. Preferably, the half-structure 3 comprises a lower base 6 and an upper shell 7, which defines one or more storage compartments. According to a variant not shown the half-structure 3 is made in one piece.

The half-structure 4 is fixed to the half-structure 3, for example by snapping devices 8, and preferably is made of one piece, so as to have two vertical side walls 9, which are parallel to the axis 5, and an upper shell 10, which defines at least one storage compartment 11.

The half-structure 4 defines a cavity 13 having an upward opening 14. The opening 14 is laterally delimited by the upper edges of the walls 9 and, in its rear part, by the shell 10.

The structure 2 also comprises a cover 17 which is arranged between the storage compartment 11 and a rear end portion 19 of the half-structure 3, in order to close the opening 14, and is fixed for example by snapping to at least one of the half-structures 3, 4. The cover 17 and the portion 19 define a longitudinal slot 18, slidingly engaged by a control lever 21, in particular a hand-brake lever.

Figure 4:
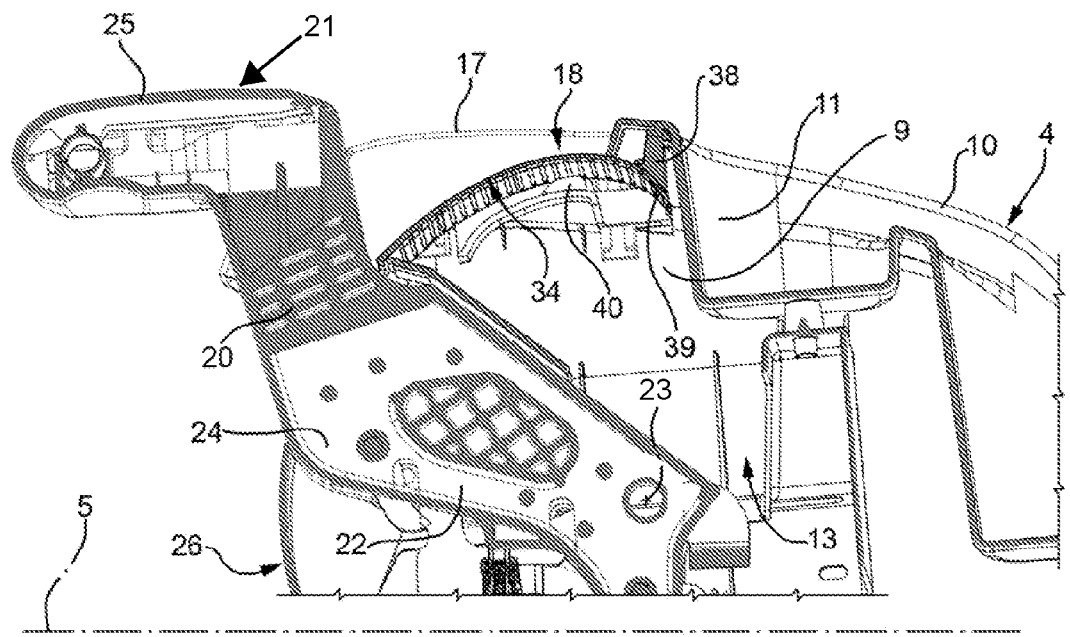
FIG. 4 is a section, along a longitudinal vertical plane, of a tunnel console which is shown in FIG. 1 and which comprises the shutter member of FIG. 1.

As shown in FIG. 4, the lever 21 is hinged about a horizontal axis 23 orthogonal to the axis 5 so as to rotate between a lowered position and a raised position and comprises a lower portion 22 housed in the cavity 13 and an intermediate portion 20 external to the structure 2. The portions 20 and 22 are shaped as a plate, which extends in a longitudinal vertical plane. The portions 20 and 22 together form an elbow 24, with an upward concavity. The portion 20 supports an upper handle 25, which has a plate shape and is substantially orthogonal to the portion 20 itself. In particular, when the lever 21 is arranged in the lowered position, the portion 20 is substantially vertical.

Figure 2:
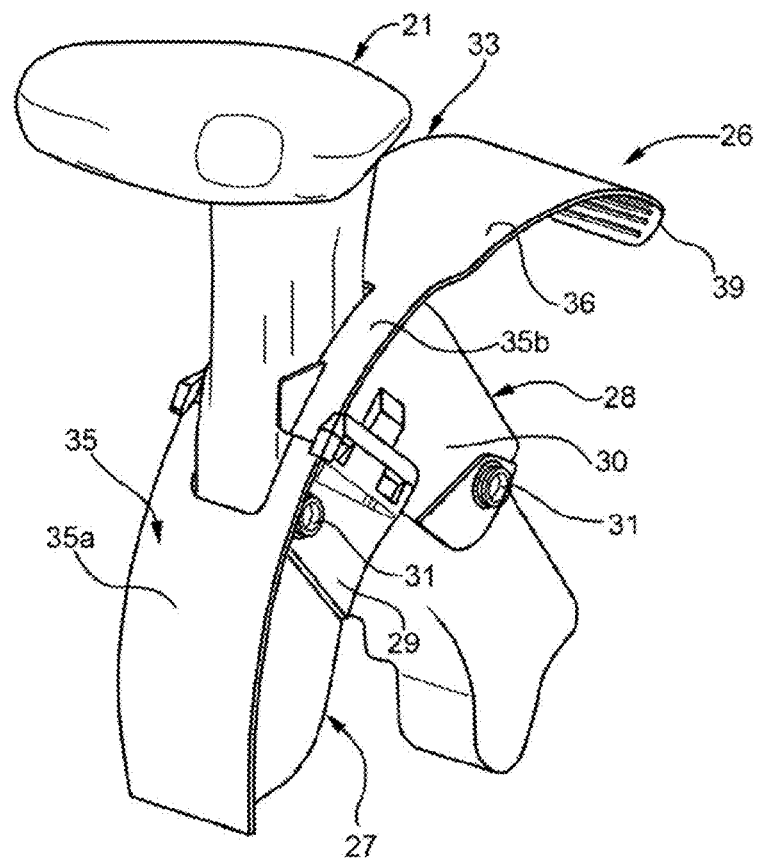
FIG. 2 illustrates in an enlarged scale the shutter member of FIG. 1.

With reference to FIG. 2, the lever 21 supports, in a fixed position, a shutter member 26, which closes the empty space around the lever 21 in the slot 18 to prevent the passage of dust or objects. The member 26 is preferably formed by a front body 27 and rear body 28, arranged on opposite sides of the elbow 24, and each made in a single piece of plastic material. The bodies 27, 28 each comprise respective half-shells 29,30, which together delimit a seat 32 (FIG. 1) engaged by the elbow 24 and define a connecting device which fix the member 26 to the lever 21. Preferably, the connecting device comprises fastening elements 31, such as screws or so-called "punch-pins", to secure at least one of the half-shells 29, 30 to the lever 21. In addition, advantageously, the half-shells 29,30 are fixed together, by means of snap coupling.

The member 26 comprises a shutter 33, which has an upper surface facing a lower annular edge 34 of the slot 18 (FIGS. 1 and 4). The edge 34 has a side profile that substantially extends at an arc of a circle about the axis 23 and comprises a front portion 34a defined by the portion 19 and a rear portion 34b defined by the cover 17. The edge 34 is slightly spaced from the upper surface of shutter 33, so as not to scrape, and therefore it does not have a guiding function, but only an upper closing function.

Referring once again to FIG. 2, the shutter 33 comprises a substantially rigid front wall 35, provided with a hole crossed by the lever 21 and having a side profile substantially as an arc of a circle about the axis 23. In particular, the wall 35 is formed of two pieces 35a, 35b that together define the above mentioned hole and are part, respectively, of the body 27 and body 28. In this way, the half-shell 29 supports and stiffens the piece 35a, and the half-shell 30 supports and stiffens the piece 35b.

The shutter 33 ends with a lip or tab 36, which extends as an elongation of the wall 35 and in cantilevered manner with respect to the half-shell 30, and is elastically flexible, mainly due to the plastic material of the body 30. Said material is preferably defined by a polyamide mixed with rubber, in a relatively low percentage.

The underside of the tab 36 has a plurality of recesses 37 (FIG. 3), which are elongated transversely, are longitudinally spaced from each other and define localized reductions in thickness, which lessen the bending stiffness of the tab 36.

Figure 5:
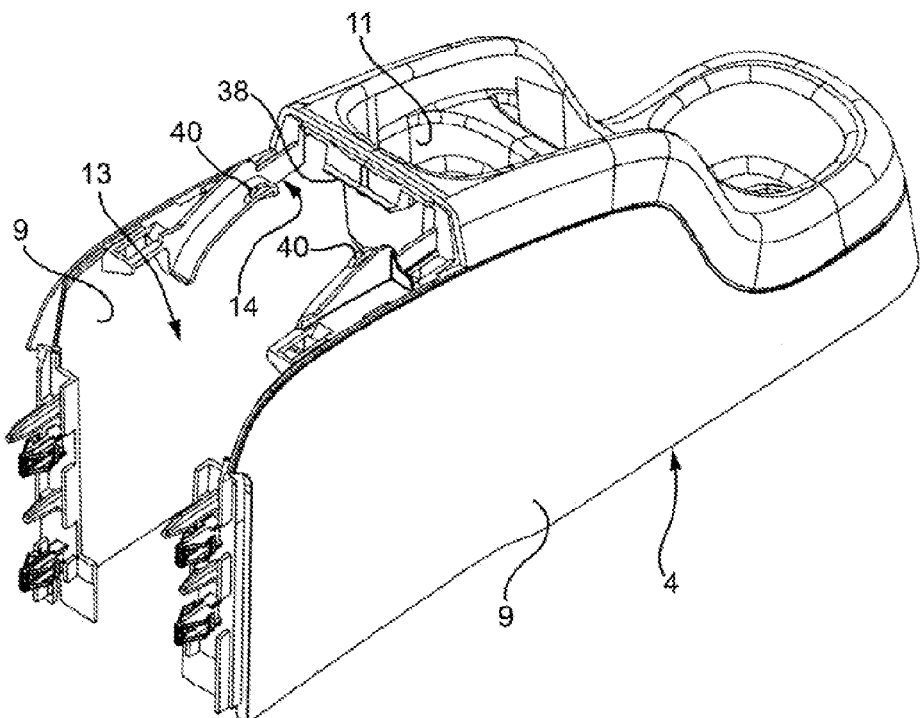
FIG. 5 illustrates, in perspective and on an enlarged scale, a detail of the tunnel console of FIG. 4.

During the reverse rotation of the lever 21 towards the raised position, the shutter 33 recedes. With reference to FIGS. 4 and 5, the tab 36 is guided at the top by a deflector 38 arranged behind the slot 18 and having such a shape as to bend the tab 36 downwards, i.e. in the cavity 13. The deflector 38 can have a width less than that of the tab 36, and preferably is part of the half-structure 4.

Figure 3:
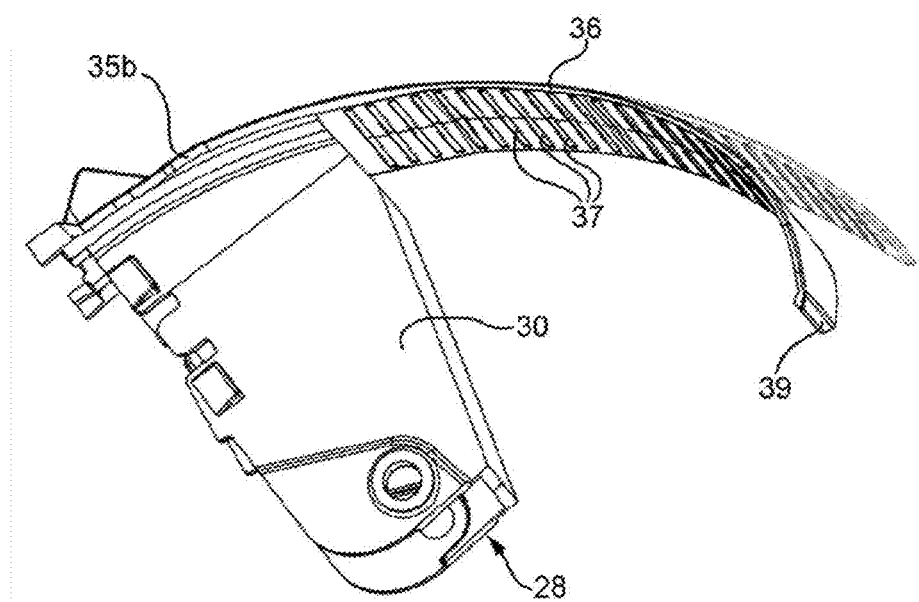
FIG. 3 shows a component of the shutter member of FIG. 1.

When the lever 21 is arranged in the lowered position, the rear end edge 39 of the tab 36 is leaning against a lower shaped face of the deflector 38 and is already elastically deformed with respect to a non-deformed inactive state (shown with thinner line in FIG. 3).

Inferiorly, the shutter 33 rests against two lateral appendices 40, which are made in one piece with the walls 9. The appendices 40 are transversely spaced apart, are symmetric with respect to a longitudinal vertical plane and do not extend for the entire length of the edge 34, but are arranged at the sides of the opening 14 in a limited area of the slot 18. The appendices 40 have respective upper surfaces that are convex curves, in order to assume a substantially crescent shape.

In use, as mentioned above, during the raising of the lever 21, the tab 36 recedes sliding on the upper surfaces of the appendices 40. At the same time, the tab 36 is bent downwards by the deflector 38. In this way, the tab 36 does not occupy the space provided for the storage compartment 11, but remains in front of it. Due to the elasticity of the tab 36, the latter always remains in contact against the deflector 38. In particular, when the lever 21 is lowered, the tab 36 naturally returns to its original shape, without compromising the aesthetic requirements of the tunnel console 1.

The guide function on the tab 36 is performed by the deflector 38, upwards, and by the appendices 40, downwards: the shape of these two components determines the deformation and therefore the actual contour of the tab 36. In addition, the components 38, 40 compensate any traverse positioning errors of the lever 21 and, therefore, of the member 26 with respect to the structure 2, since they are formed upon the same element, i.e. the half-structure 4.

To assemble the tunnel console 1, first of all the bodies 27, 28 are pre-mounted on the lever 21 in a fixed position. At this stage of assembly, the tab 36 is in its non-deformed inactive position.

The half-structure 4 is then coupled to the half-structure 3, presenting the lever 21 in its lowered position and placing the appendices 40 under the tab 36. During this stage of assembly, the tab 36 is slightly bent and inserted below the deflector 38. After the snapping engagement between the half-structures 3 and 4, the tab 26 is then in its deformed working state.

At this point, the cover 17 is lowered to close the opening 14, until it is snappingly fixed to the upper part of the half-structure 4.

According to a variant not shown, the deflector 38 is made in one piece with the cover 17. In this case, during the assembly the end portion 19 of the tab 36 is deformed downward by the deflector 38 when the cover 17 is lowered upon the opening 14. Closing the opening 14, the cover 17 is snappingly fixed to both half-structures 3, 4.

From the foregoing it is evident that the member 26 may be pre-mounted on the lever 21, thus facilitating the assembly of the tunnel console 1. The assembly operations are further simplified by the fact that the body 26 is composed of two distinct bodies between which the lever 21 is arranged, and the fact that there are no side rails wherein the shutter 33 must slide. In fact, the guide function is only required for the rear part of the shutter 33, i.e. for the tab 36, and is performed by the appendices 40 of the deflector 38, which do not extend for the entire length of the slot 18, but are arranged in specific locations of limited width. This also allows to compensate for any transverse positioning errors of the lever 21 and of the member 26 with respect to the structure 2.

The flexibility of the tab 36 allows much freedom in designing the structure spaces 2 of the tunnel console 1. In particular, it is possible to exploit a larger volume to provide storage compartments on the half-structure 4 (open or closed by doors). Moreover, the particular shape given to the lever 21 helps to optimize the distribution of space in the structure 2 and design a structure 2 which is relatively high between the seats of the motor vehicle, but that is compact along the axis 5.

From the foregoing it appears, therefore, evident that to the member 26 and the tunnel console 1, described and illustrated, changes and variations may be made that do not go beyond the protective scope of the present invention, as defined in the appended claims.

In particular, the lever 21 may be defined by an automatic transmission lever; and/or the structure 2 may be shaped differently and/or made of components other than those indicated as an example.

The invention claimed is:

1. A tunnel console of a motor vehicle for a control lever that is rotatable about an axis between two end limit positions, the tunnel console comprising:
    a structure adapted to be arranged between two front seats of the vehicle and having a slot configured for said control lever to be arranged therein;
    a shutter member comprising
        a front body having a first wall that is continuously curved between a first end and a second end and that includes a first upper surface and a first lower surface opposing the first upper surface extending longitudinally between a first sidewall and a second sidewall that is spaced from and parallel to the first sidewall and delimited at the first end extending transverse between the first sidewall and the second sidewall and the second end, which is spaced from the first end, extending transverse between the first sidewall and the second sidewall of the first wall and a first half-shell defining a first cavity extending from the first lower surface of the first curved wall,
        a rear body, which is separate from and independent of the front body, having a second wall that is continuously curved between a first end and a second end and that includes a second upper surface and a second lower surface opposing the second upper surface extending longitudinally between a first sidewall and a second sidewall that is spaced from and parallel to the first sidewall and delimited at the first end extending transverse between the first sidewall and the second sidewall and the second end, which is spaced from the first end, extending transverse between the first sidewall and the second sidewall of the second wall and a second half-shell defining a second cavity extending from the second lower surface of the second curved wall, the front body and the rear body together defining an opening adapted to surround said control lever at the second end of the front body and the second end of the rear body and the first half-shell and the second half-shell being connectable to each other by fasteners, and
        an elastically flexible tab extending from the first end of one of the first wall or the second wall; and
    at least one guiding element extending from the structure, which guides said tab and bends said tab downward during a rotation of said control lever toward the guiding element.

2. The tunnel console according to claim 1, wherein said slot is defined by a substantially rigid wall that has a lower surface facing the first upper surface and the second upper surface of said shutter member with said substantially rigid wall with said slot having a side profile that is substantially arc-shaped as viewed in relation to an axis of rotation of said control lever.

3. The tunnel console according to claim 1, wherein said guiding element comprises two lateral appendices, which are symmetrical, extend parallel to each other and are transversely spaced from each other to define a lower support for said tab.

4. The tunnel console according to claim 1, wherein said guiding element comprises a deflector extending from said structure transverse to said slot, said deflector defining an upper stop for said tab configured to bend the tab downwards during rotation of said control lever.

5. The tunnel console according to claim 3, wherein said structure comprises a rear half-structure defining an internal cavity having an upper opening and an upper cover that is arranged to close said upper opening and fixed with respect to said rear half-structure to define at least part of said slot with said lateral appendices formed integral with said rear half-structure.

6. The tunnel console according to claim 4, wherein said structure comprises a rear half-structure defining an internal cavity having an upper opening and an upper cover that is arranged to close said upper opening and fixed with respect to said rear half-structure to define at least part of said slot with said deflector is formed integral with said rear half-structure.

7. The tunnel console according to claim 1, wherein said control lever is a hand brake lever comprising a lower end portion housed in said structure, an intermediate portion extending from said lower end portion external to said structure, an elbow extending between said intermediate portion and said lower end portion and having an upward concavity, and an upper handle, which is supported by said intermediate portion, has a substantially plate shape and is substantially orthogonal to said intermediate portion.

8. A shutter member for a motor vehicle control lever, comprising:
    a front body having a first wall that is continuously curved between a first end and a second end and that includes an upper surface and a lower surface opposing the upper surface extending longitudinally between a first sidewall and a second sidewall that is spaced from and parallel to the first sidewall and delimited at the first end extending transverse between the first sidewall and the second sidewall and the second end, which is spaced from the first end, extending transverse between the first sidewall and the second sidewall of the first curved wall with a first aperture extending from the second end of the first wall, between the upper surface and the lower surface of the first wall, toward the first end of the first wall and a first half-shell defining a first cavity extending from the lower surface at the second end of the first wall;
    a rear body, which is separate from and independent of the front body, having a second wall that is continuously curved between a first end and a second end and that includes an upper surface and a lower surface opposing the upper surface extending longitudinally between a first sidewall and a second sidewall that is spaced from and parallel to the first sidewall and delimited at the first end extending transverse between the first sidewall and the second sidewall and the second end, which is spaced from the first end, extending transverse between the first sidewall and the second sidewall of the second curved wall with a second aperture extending from the second end of the second wall, between the upper surface and the lower surface of the second wall, toward the first end of the second wall and a second half-shell defining a second cavity extending from the lower surface at the second end of the second wall; and an elastically flexible tab that is bendable upon an application of force extending from the first end of one of the first wall or the second wall, wherein the first half-shell and the second half-shell are connectable to each other by fasteners such that when the first half-shell and the second half-shell are fastened to each other, the first aperture of the front body and the second aperture of the rear body are aligned to define an opening that is configured to surround the control lever.

9. The shutter member according to claim 8, wherein the first half shell of the front body includes a first sidewall extending from the lower surface of the first wall and a second sidewall spaced parallel to the first sidewall extending from the lower surface of the first wall and a third sidewall extending from the lower surface of the first wall between the first sidewall and the second sidewall to define the first cavity.

10. The shutter member according to claim 8, wherein the second half shell of the rear body includes a first sidewall extending from the lower surface of the second wall, a second sidewall spaced parallel to the first sidewall extending from the lower surface of the second wall and a third sidewall extending from the lower surface of second wall between the first sidewall and the second sidewall to define the second cavity.

11. The shutter member according to claim 8, wherein said tab extends in a cantilevered manner with respect to one of the front body and the rear body.

12. The shutter member according to claim 8, wherein said tab has a lower face with a plurality of recesses formed therein, which are transversely elongated and longitudinally spaced from each other.

13. The shutter member according to claim 8, wherein the front body and the rear body are each independently comprised of a single piece of plastic material.

14. The shutter member according to claim 8, wherein the first half-shell and the second half-shell together delimit the first cavity and the second cavity which are adapted to be engaged by said lever.

15. The shutter member according to claim 14, wherein the first half-shell and the second half-shell each comprise snap-coupling means to be engaged to one another to fasten the first half-shell and the second half-shell to each other.

16. A tunnel console of a motor vehicle for a control lever that is rotatable about an axis between two end limit positions, the tunnel console comprising:

a structure having a slot, which has a lower annular edge;

a control lever, which engages the slot and is rotatable in the slot with respect to the structure about a horizontal axis between two end limit positions;

a shutter member arranged within and coupled to said structure to encompass an empty space around the control lever in the slot, said shutter member comprising a shutter having an upper surface radially facing the lower annular edge and including a substantially rigid wall, an elastically flexible tab extending in a cantilevered manner from a first end of the substantially rigid wall, and a hole that is arranged in the substantially rigid wall, is spaced from the tab and surrounds the control lever, and the shutter member further comprising fastening elements fixing said shutter member to said control lever; and at least one guiding element extending from the structure, guiding the tab and bending the tab downward during a rotation of the control lever about the horizontal axis toward the guiding element, wherein the lower annular edge and the substantially rigid wall have respective side profiles extending along respective circle arcs that are concentric about the horizontal axis;

wherein the shutter member is formed of a front body and a rear body, each one of the front body and the rear body is a single piece and is independent and distinct from the other of the front body and the rear body and the substantially rigid wall is formed of a front portion and a rear portion that together define the hole and are part of the front body and the rear body, respectively;

wherein the front body comprises a front half-shell that projects from the front portion toward the horizontal axis and the rear body comprises a rear half-shell that projects from the rear portion toward the horizontal axis and together the front half-shell and the rear half-shell delimit a seat engaged by the control lever; and wherein the front half-shell and the rear half-shell are snap-coupled to each other.

* * * * *